(12) United States Patent
Meyer et al.

(10) Patent No.: US 12,034,213 B2
(45) Date of Patent: Jul. 9, 2024

(54) RADAR SENSOR

(71) Applicant: Robert Bosch GmbH, Stuttgart (DE)

(72) Inventors: Johannes Meyer, Ettlingen (DE); Martin Nezadal, Leonberg (DE); Andreas Pietsch, Bietigheim-Bissingen (DE); Thomas Schmidt, Backnang (DE); Maik Hansen, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 650 days.

(21) Appl. No.: 17/262,047

(22) PCT Filed: Aug. 10, 2019

(86) PCT No.: PCT/EP2019/071517
§ 371 (c)(1),
(2) Date: Jan. 21, 2021

(87) PCT Pub. No.: WO2020/083542
PCT Pub. Date: Apr. 30, 2020

(65) Prior Publication Data
US 2021/0313702 A1    Oct. 7, 2021

(30) Foreign Application Priority Data

Oct. 25, 2018  (DE) .......................... 102018218253.1

(51) Int. Cl.
*H01Q 17/00* (2006.01)
*G01S 13/931* (2020.01)
(Continued)

(52) U.S. Cl.
CPC .............. *H01Q 17/00* (2013.01); *H01Q 1/38* (2013.01); *H01Q 1/42* (2013.01); *G01S 13/931* (2013.01)

(58) Field of Classification Search
CPC ............ H01Q 17/00; H01Q 1/38; H01Q 1/42; G01S 13/931; G01S 7/032
See application file for complete search history.

(56) References Cited

U.S. PATENT DOCUMENTS

| 7,126,525 B2* | 10/2006 | Suzuki ................ H01Q 17/001 342/175 |
| 7,132,976 B2* | 11/2006 | Shinoda ................ G01S 13/931 342/75 |
| 2002/0190891 A1 | 12/2002 | Viana et al. |

(Continued)

FOREIGN PATENT DOCUMENTS

| CN | 203166089 U | 8/2013 |
| CN | 104600428 A | 5/2015 |

(Continued)

OTHER PUBLICATIONS

17262047_2023-12-15_DE_102018212615_A1_M.pdf, machine translation of DE-102018212615-A1 (Year: 2020).*

(Continued)

*Primary Examiner* — Timothy A Brainard
*Assistant Examiner* — Kenneth W Good
(74) *Attorney, Agent, or Firm* — NORTON ROSE FULBRIGHT US LLP; Gerard A. Messina

(57) ABSTRACT

A radar sensor having at least one antenna structure and at least one coupling structure, which is designed to couple substrate waves out of an antenna substrate used as a carrier for the antenna structure and the coupling structure, and to emit them as coupled waves into an emission region. The radar sensor has an absorber which is situated in the emission region in order to absorb the coupled waves.

10 Claims, 2 Drawing Sheets

(51) Int. Cl.
*H01Q 1/38* (2006.01)
*H01Q 1/42* (2006.01)

(56) References Cited

U.S. PATENT DOCUMENTS

| | | | |
|---|---|---|---|
| 2004/0227663 A1 | 11/2004 | Suzuki et al. | |
| 2005/0030244 A1 | 2/2005 | Durham et al. | |
| 2006/0238404 A1* | 10/2006 | Ikeda | H01Q 17/004 |
| | | | 342/175 |
| 2013/0113670 A1* | 5/2013 | Chamseddine | H01Q 19/10 |
| | | | 343/834 |
| 2015/0171511 A1 | 6/2015 | Pleva | |
| 2016/0013557 A1* | 1/2016 | Kawaguchi | H01Q 21/08 |
| | | | 343/904 |
| 2018/0013208 A1 | 1/2018 | Izadian et al. | |
| 2018/0166791 A1* | 6/2018 | Kim | H01Q 1/38 |
| 2020/0025913 A1* | 1/2020 | Park | H01Q 1/32 |
| 2020/0309902 A1* | 10/2020 | Peng | H01Q 1/42 |
| 2023/0253717 A1* | 8/2023 | Petersson | H01P 3/123 |
| | | | 343/702 |

FOREIGN PATENT DOCUMENTS

| | | | |
|---|---|---|---|
| CN | 107946744 A | | 4/2018 |
| CN | 207677051 U | | 7/2018 |
| DE | 102007008202 A1 | | 5/2008 |
| DE | 102010017978 A1 | | 12/2011 |
| DE | 102011122346 A1 | | 6/2013 |
| DE | 102012202913 A1 | | 8/2013 |
| DE | 102018212615 A1 | * | 1/2020 |
| EP | 0884799 A2 | | 12/1998 |
| EP | 1462817 A1 | | 9/2004 |
| EP | 1674882 A1 | | 6/2006 |
| JP | 2010171836 A | | 8/2010 |
| JP | 2018129623 A | | 8/2018 |

OTHER PUBLICATIONS

International Search Report for PCT/EP2019/071517, Issued Nov. 8, 2019.

* cited by examiner

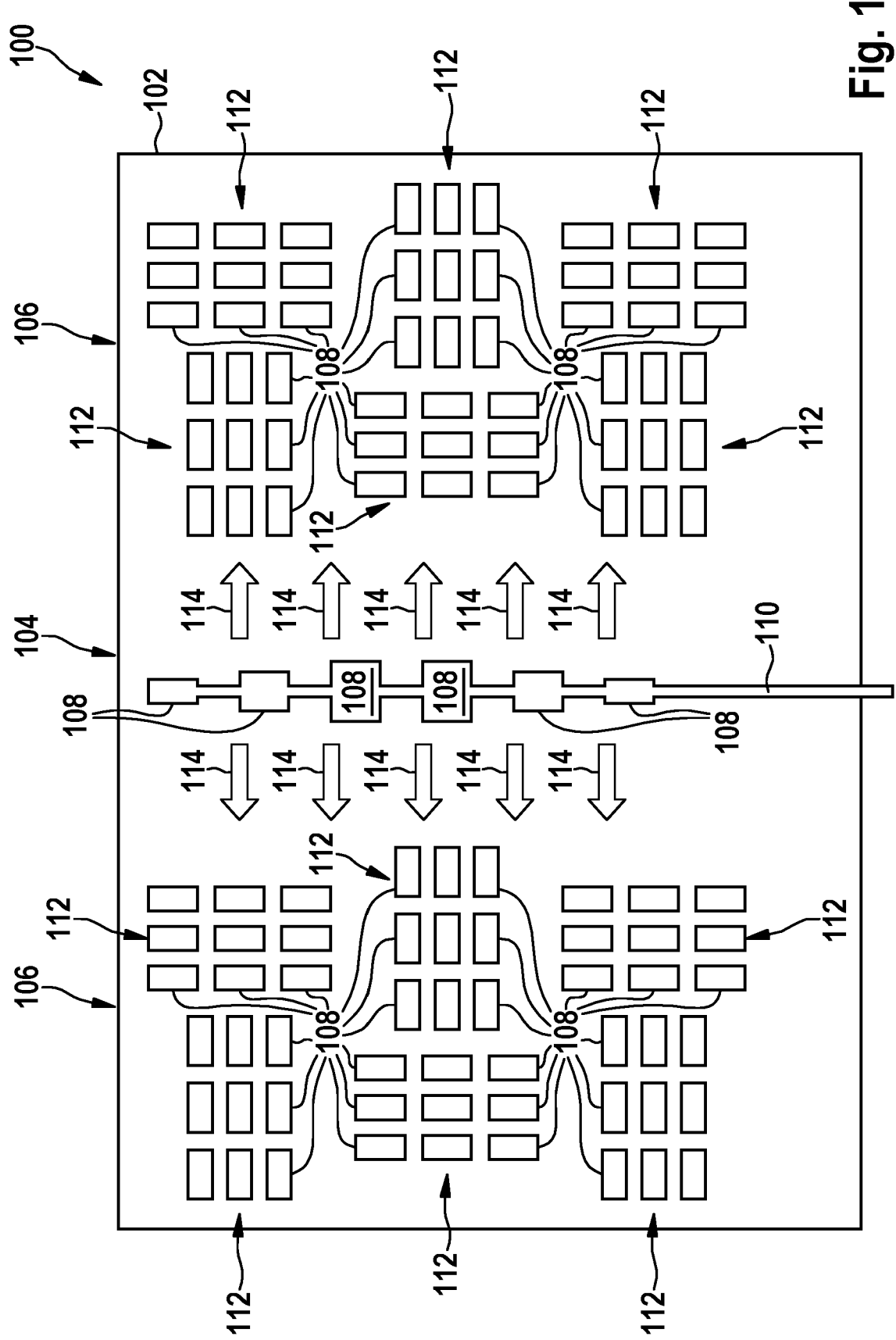

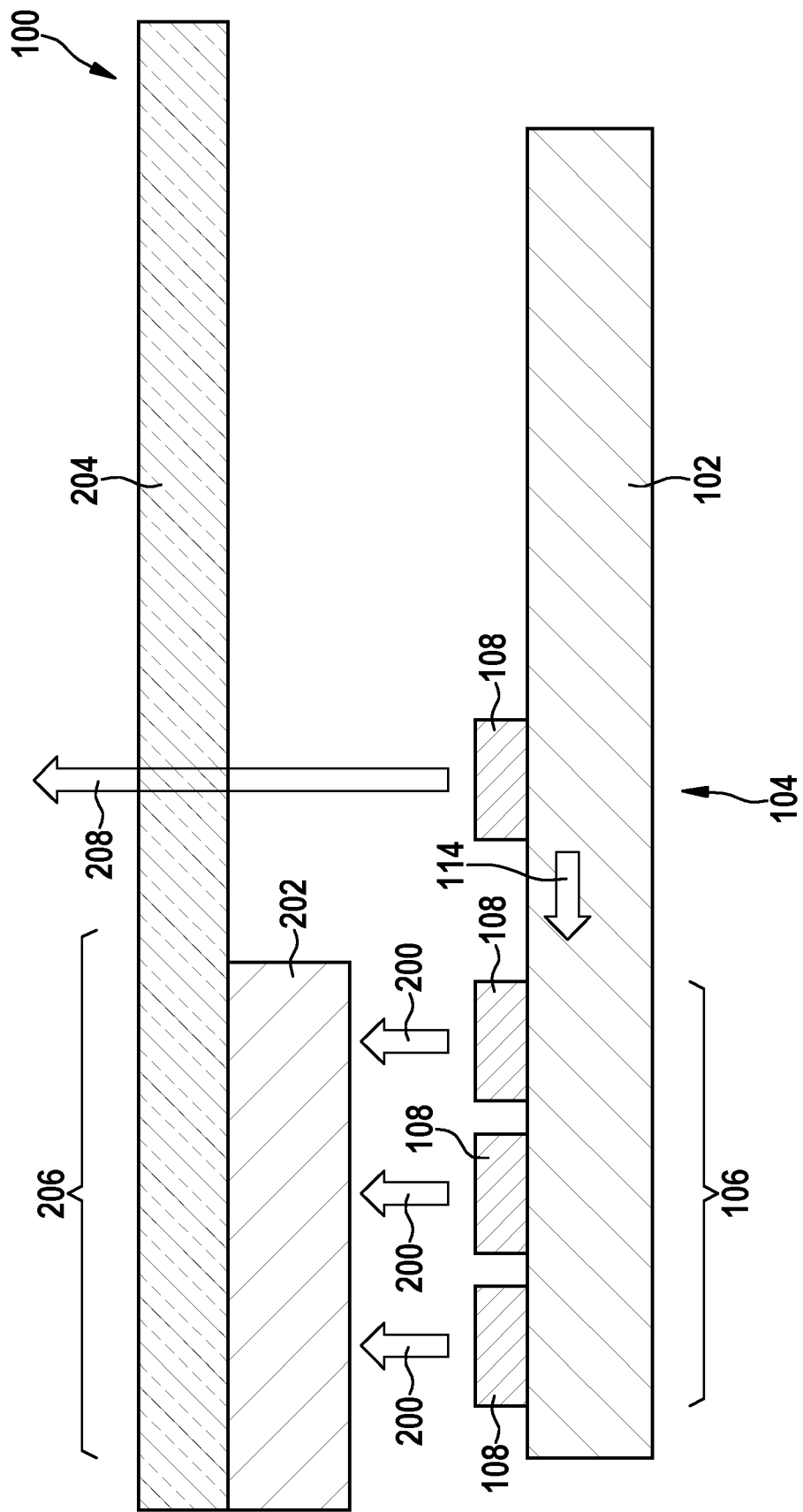

RADAR SENSOR

FIELD

The present invention relates to a radar sensor.

BACKGROUND INFORMATION

Radar sensors are used for detecting objects in the distance. For this purpose, electromagnetic radar waves are emitted in a predefined direction and components reflected at the objects are received again and evaluated. For example, radar sensors may be used on motor vehicles for the detection of obstacles or other road users.

German Patent Application No. DE 10 2012 202 913 A1 describes a radar sensor.

SUMMARY

The present invention provides a radar sensor. Advantageous further developments and improvements of the approach presented here result from the description herein.

Embodiments of the present invention advantageously may make it possible to decouple substrate waves in a controlled manner from an antenna substrate as coupled waves during the operation of a radar sensor and to absorb them in a controlled manner. A method of functioning of the radar sensor and in particular its emission characteristic is able to be improved in this way.

A radar sensor having at least one antenna structure and at least one coupling structure is provided, the coupling structure being designed to decouple substrate waves from an antenna substrate used as a carrier of the antenna structure and the coupling structure and to emit them as coupled waves in an emission region; in addition, the radar sensor has an absorber, which is situated in the emission region in order to absorb the coupled waves.

Ideas in connection with embodiments of the present invention may be considered to be based, among other things, on the ideas and recognitions described in the following text.

An antenna substrate may be referred to as a circuit board. The antenna substrate is electrically non-conductive. Electrically conductive structures such as circuit traces, through platings and metallized surfaces may be situated on the antenna substrate and/or be integrated into the antenna substrate. A portion of the electrically conductive structures are able to form an antenna structure. Another portion of the electrically conductive structures may form a coupling structure. The antenna structure is connected to a control electronics. The antenna structure is able to emit electromagnetic waves when an electrical high-frequency signal is applied to it by the control electronics. The antenna structure is thereby able to function as a transmit antenna. The antenna structure may have a directivity and emit a large portion of the electrical energy conveyed to it by the high-frequency signal in a defined angular range. In addition, the antenna structure is able to image an incoming electromagnetic signal in a high-frequency signal and thereby act as a receive antenna.

In particular, electrically conductive subregions of the surface of the antenna substrate are able to form the antenna structure. An electrically conductive material may be situated on the surface in order to form the antenna structure. The electrically conductive material can be printed onto the surface. Different printing methods such as screen printing, reel-fed printing and others may be used. As an alternative, the electrically conductive material is able to be deposited on the surface in some other manner. Different deposition methods such as a gas phase deposition (e.g., CVD methods or PVD methods) or a deposition from a liquid phase (e.g., galvanic or currentless plating) are usable. Prior to the deposition, areas on which no electrically conductive material is to be deposited are able to be shielded by a mask. The mask may be removed again after the deposition. Alternatively, an electrically conductive material is able to be deposited across the entire surface and after a mask has been applied, undesired subregions may be removed again by etching. The masking and depositing make it possible to align the antenna structure on the surface with high precision. The subregions may be connected to one another in an electrically conductive manner. The subregions are able to form antenna structures of different sizes or powers.

Because of high-frequency effects, a portion of the electrical energy supplied by the control electronics is able to be coupled from the antenna structures into the antenna substrate in the form of substrate waves and propagate within the antenna substrate. At edges of the antenna substrate such as at the margins, the substrate waves are able to decouple in an uncontrolled manner, radiate in an uncontrolled direction and cause disturbances as a result.

The coupling structure may function as an interception device or a trap for the substrate waves and selectively decouple the substrate waves from the antenna substrate. The coupling structure then acts as an antenna itself and may in turn emit electromagnetic waves, which are referred to as coupled waves here. More specifically, the coupling structure is able to emit the electromagnetic waves into an emission region. The coupling structure may have its own directivity for this purpose. The directivity of the coupling structure may differ considerably from the directivity of the antenna structure. The directivity of the coupling structure may be directed toward the absorber.

An absorber converts absorbed electromagnetic waves into heat. For example, the absorber may be made of a plastic material having a high share of electrically conductive particles and/or fibers of carbon such as graphite. In the same way, the absorber may be made of a metallic or metallized foam.

The antenna structure is able to be aligned along a main extension direction in order to have the directivity. A main emission direction may be situated along the main extension direction next to the antenna structure. The coupling structure is able to be placed next to the antenna structure. In other words, the coupling structure may be situated at a lateral offset from the antenna structure.

The coupling structure is able to be electrically separated from the antenna structure. The coupling structure may be insulated from the antenna structure by the antenna substrate. No electric current is able to flow between the antenna structure and the coupling structure. The coupling structure could be a passive element of the radar sensor.

Electrically conductive subregions of a surface of the antenna substrate may form the coupling structure. During the production of the antenna structure, the electrically conductive material for the coupling structure can be placed on the surface in the same working step. The electrically conductive material both for the antenna structure and for the coupling structure is able to be printed onto the surface in a common working step. The electrically conductive material may be deposited on the surface in a common working step. Prior to the deposition, areas on which no electrically conductive material is to be deposited either for the antenna structure or for the coupling structure are able to be masked with the aid of a mask. The mask can be removed again after the deposition process. By masking and depositing, the coupling structure is able to be aligned with high precision relative to the antenna structure. Because of the placement of the coupling structure on the surface, substrate waves running along the surface are able to be decoupled in a particularly satisfactory manner.

The subregions are able to be electrically separated from one another. The coupling structure may have individual areas that are not contiguous. A mutual influencing of the individual subregions of the coupling structure is able to be reduced by individual areas that are separated.

The subregions are able to form antenna structures which are aligned in different directions. The differently aligned antenna structures are aligned at different angles with respect to the main extension direction of the antenna structure. Due to the different angles, the coupling structure has a weaker directivity than the antenna structure. The different angles make it possible for the coupling structure to decouple substrate waves from different directions out of the antenna structure.

Antenna structures having the same alignment are able to be placed in groups. Identically aligned antenna structures may be placed at regular intervals. Through the planned alignment of the antenna structures, expected frequencies of the substrate waves are able to be decoupled from the antenna substrate in a particularly satisfactory manner.

The absorber is able to be placed on a surface of a radome of the radar sensor situated opposite the coupling structure. A radome may be a protective cap of the radar sensor. The radome may be transparent to the electromagnetic waves. It is possible for the absorber to be situated so as to be spatially separate from the antenna substrate. Because of the physical separation, the absorber is safely able to be electrically insulated from the antenna structure. Electric currents possibly resulting in the absorber are thereby safely separated from the antenna structure. Produced heat can be dissipated via the radome.

In addition, the absorber may be designed to shield a control electronics of the radar sensor. The absorber is able to be placed in the emission region of the coupling structure and upstream from the control electronics. In this way, a single component has the capability of satisfying both functions.

BRIEF DESCRIPTION OF THE DRAWINGS

In the description below, embodiments of the present invention are described with reference to the figures, but neither the figures nor the description should be understood as restricting the present invention.

FIG. 1 shows a radar sensor according to an exemplary embodiment of the present invention.

FIG. 2 shows a sectional view through a radar sensor according to an exemplary embodiment of the present invention.

The figures are merely schematic and not drawn true to scale. Identical reference numerals in the figures denote identical or equally acting features.

DETAILED DESCRIPTION OF EXAMPLE EMBODIMENTS

In radar sensors which have antennas on a high-frequency (HF) substrate and depending on the realization, undesired power components may occur, which propagate in the circuit board substrate and are known as substrate waves. What are termed high-impedance structures may be used to suppress the substrate waves. When using high-impedance structures, through-contacting to the ground surface is required. Additional production costs and production risks may arise on account of the large number of structures.

For this reason, the approach introduced here uses structures that emit the power of the substrate waves into an absorber and require no additional production steps.

FIG. 1 shows a representation of a radar sensor 100 according to an exemplary embodiment. Radar sensor 100 has an antenna substrate 102, which is used as a carrier for at least one antenna structure 104 of radar sensor 100, and at least one coupling structure 106 of radar sensor 100. Antenna structure 104 may be denoted as an antenna array. Antenna structure 104 has multiple individual antenna structures 108 which are situated in a row next to one another. The row is aligned along a main direction of antenna structure 104. In this particular instance, antenna structure 104 is depicted with six individual antenna structures 108. The number of individual antenna structures 108 is adaptable to the specific requirements.

Antenna structures 108 are connected to one another and to a control electronics of radar sensor 100 by an electrically conductive circuit trace 110 of antenna substrate 102. Circuit trace 110 is also aligned along the main direction. Antenna structures 108 are metallized areas on a surface of antenna substrate 102 in this case. The middle antenna structures 108 of antenna structure 104 are larger than antenna structures 108 situated outside.

Coupling structure 106 is situated on both sides of antenna structure 104. In this instance, coupling structure 106 is made up of a multitude of metallized areas on the surface of antenna substrate 102. The individual surfaces of coupling structure 106 are not electrically connected to one another or to antenna structure 104. The metallized surfaces of coupling structure 106 likewise form antenna structures 108. Antenna structures 108 of coupling structure 106 are aligned in a different manner. Nine antenna structures 108 having the same alignment are grouped to form a 3×3 matrix 112 in each case. The antenna structures of adjacent matrices have a different alignment. Here, antenna structures 108 are aligned in two directions. The one half of antenna structures 108 is aligned along the main direction. The other half is aligned transversely to the main direction.

If an electrical excitation signal is applied to antenna structures 108 of antenna structure 104 via circuit trace 110, antenna structure 104 emits a portion of the supplied power in the form of electromagnetic radar waves in a construction-dependent emission direction. Another portion of the power is coupled into antenna substrate 102 as substrate waves 114.

Antenna structures 108 of coupling structure 106 couple substrate waves 114 out of antenna substrate 102 and in turn emit coupled waves into an emission region of coupling structure 106.

At least one absorber, which is not shown here, is situated in the emission region and absorbs the coupled waves and converts them into heat.

Antenna structures 104 are able to be operated at a frequency of 76 GHz, for example. Parasitic high-frequency effects are created in the process. One such high-frequency effect is substrate waves 114, which propagate up to other electrical conductors or edges of antenna substrate 102 from where they are emitted.

The edges of antenna substrate 102 are subject to production tolerances so that a direction of emission at the edges is uncertain. The uncertain emission is able to change an antenna diagram of the radar sensor.

FIG. 2 shows a sectional view through a radar sensor 100 according to an exemplary embodiment. Radar sensor 100 essentially corresponds to the radar sensor in FIG. 1. Coupled waves 200, absorber 202 and a radome 204 of radar sensor 100 are shown in addition. Antenna structures 108 of coupling structure 106 couple substrate waves 114 out of antenna substrate 102 and emit coupled waves 200 into emission region 206. Absorber 202 is situated in emission range 206. In this instance, absorber 201 is situated on radome 204. The absorber is separated from coupling structure 106 by a gap and is therefore electrically insulated from antenna structures 108 of coupling structure 106.

Radome 204 is transparent to radar waves 208 emitted by antenna structure 104 and protects the electrical components of radar sensor 100 from environmental effects.

In other words, for the production, additional structures are mounted on antenna substrate 102, which is also denoted as sensor circuit board, next to the antennas or around the antennas, which convey incoming substrate waves 114 in the direction of an absorber 202 situated above or which emit and thus dampen them. In this way, the antenna characteristic is affected as little as possible. No further manufacturing steps are required for producing the structures in the production process. The approach introduced here is therefore neutral in terms of costs. In addition, substrate waves 114 are thereby emitted from the substrate instead of being reflected at high-impedance structures.

According to the approach presented here, a radar sensor 100 has a circuit board including a transmit and receive antenna in a housing which includes a radome 204, transparent to radar, above the antennas, and an absorber 202 inside the housing. Further metallic structures are present in addition to antenna structures 104, which convey the power propagating from the antennas in the substrate in the direction of absorber 202. Patch antennas may preferably be used as structures because they are easily produced in the production process of the circuit board. The patch antennas may be positioned next to the antennas in the form of rectangular structures. The structures are able to be positioned underneath or closely next to absorber 202 in order to absorb emitted substrate waves 114 in absorber 202 so that they do not change the antenna characteristic.

Coupling structure 106 and antenna structure 104 are able to be metallically etched and/or deposited. The individual surfaces of coupling structure 106 may have a length of four millimeters and a width of two millimeters, for instance. The length is a function of a wavelength of emitted radar waves 208. The length of the individual surfaces may have a harmonic relationship to the wavelength. For instance, the length may amount to ¼λ or an integral multiple of the wavelength. The suitable length is also dependent on dimensions and/or high-frequency characteristics of antenna substrate 102.

Finally, it is pointed out that terms such as 'having', 'including', etc. do not exclude any other elements or steps, and terms such as 'a' do not exclude a plurality.

What is claimed is:

1. A radar sensor, comprising:
an antenna structure formed of (a) a plurality of emitters having respective emission surfaces and (b) an electrically conductive line physically connecting the plurality of emitters to one another and to control electronics, the control electronics being configured to generate an electrical signal provided to the plurality of emitters via the electrically conductive line causing the plurality of emitters to emit radar waves in a first direction towards an exterior of the radar sensor;
a coupling structure formed of at least one emitter that each has a respective emission surface that faces in the first direction and is electrically insulated from all other components of the radar sensor, so that the at least one emitter is electrically insulated from (a) the antenna structure, (b) the electrically conductive line, and (c) the control electronics;
a substrate carrying the antenna structure and the coupling structure; and
an absorber having an absorption surface facing opposite the first direction, towards the emission surface of the at least one emitter, wherein:
the coupling structure is configured to emit, via the emission surface of the at least one emitter of the coupling structure, substrate waves from the substrate as coupled waves in the first direction towards the absorption surface of the absorber; and
the absorber is configured to absorb the coupled waves emitted by the coupling structure.

2. The radar sensor as recited in claim 1, wherein the coupling structure is situated laterally offset from, and on a same side of the substrate as, the antenna structure.

3. The radar sensor as recited in claim 1, wherein each of the at least one emitter is electrically conductive and is layered directly on a surface of the substrate.

4. The radar sensor as recited in claim 1, wherein the at least one emitter includes a plurality of emitters that are each electrically conductive and that are electrically insulated from one another.

5. The radar sensor as recited in claim 1, wherein the at least one emitter includes a plurality of emitters that are aligned with their respective lengths oriented in different directions than one another.

6. The radar sensor as recited in claim 1, wherein the at least one emitter includes a plurality of emitters grouped into (a) a first group of antennas whose lengths are all arranged with a same alignment as one another in a same second direction and (b) a second group of antennas whose lengths are all arranged with a same alignment as one another in a same third direction that is different than the second direction.

7. The radar sensor as recited in claim 1, wherein the absorber is situated on a surface of a radome of the radar sensor, an interior of the radome facing, opposite the first direction, towards the antenna structure and the coupling structure.

8. The radar sensor as recited in claim 1, wherein the absorber is furthermore configured to shield a control electronics of the radar sensor.

9. The radar sensor as recited in claim 1, further comprising a radome, wherein:
the antenna structure is arranged to emit the radar waves in the first direction through the radome into a surrounding environment that is at the exterior of the radar sensor, the first direction being from the substrate towards the radome;
the absorber is arranged on an interior surface of the radome; and
the coupling structure is configured to perform its emission towards the absorption surface of the absorber.

10. The radar sensor as recited in claim 9, wherein:
the absorber is formed of plastic having mixed therein at least one of electrically conductive particles and carbon fibers, and is configured to convert the absorbed coupled waves emitted from the coupling structure into heat and dissipate the heat via the radome;

the at least one emitter includes a plurality of groups of emitters the groups of emitters are arranged into a grid of rows of the groups and columns of the groups;

for each of a first set of the groups, lengths of all of the emitters of the respective group are arranged with a same alignment as one another in a same second direction;

for each of a second set of the of the groups, lengths of all of the emitters of the respective group are arranged with a same alignment as one another in a same third direction that is different than the second direction;

for each of the columns, each pair of immediately adjacent ones of the groups is formed of a group from the first set and a group from the second set; and for each of the rows, each pair of immediately adjacent ones of the groups is formed of a group from the first set and a group from the second set.

* * * * *